United States Patent
Mamun et al.

(10) Patent No.: US 12,323,063 B2
(45) Date of Patent: Jun. 3, 2025

(54) DRIVE EQUIPMENT AND CONTROL METHOD

(71) Applicant: TOSHIBA MITSUBISHI-ELECTRIC INDUSTRIAL SYSTEMS CORPORATION, Chuo-ku (JP)

(72) Inventors: Mostafa Mamun, Tokyo (JP); Akihiko Kuroiwa, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/006,880

(22) PCT Filed: Jun. 10, 2021

(86) PCT No.: PCT/JP2021/022102
§ 371 (c)(1),
(2) Date: Jan. 26, 2023

(87) PCT Pub. No.: WO2022/259459
PCT Pub. Date: Dec. 15, 2022

(65) Prior Publication Data
US 2024/0120842 A1    Apr. 11, 2024

(51) Int. Cl.
*H02M 3/335* (2006.01)
*H02M 1/00* (2007.01)
(Continued)

(52) U.S. Cl.
CPC ..... *H02M 3/33507* (2013.01); *H02M 1/0009* (2021.05); *H02M 1/36* (2013.01); *H02P 27/06* (2013.01)

(58) Field of Classification Search
CPC .. H02M 3/33507; H02M 1/0009; H02M 1/36; H02M 5/12; H02M 5/4585;
(Continued)

(56) References Cited

U.S. PATENT DOCUMENTS 7,468,595 B2 * 12/2008 Lee ............... H02P 27/047
                                                  318/807
2007/0024231 A1   2/2007 Lee et al.

FOREIGN PATENT DOCUMENTS

JP        55-150786 A    11/1980
JP        62-44089 A     2/1987
(Continued)

OTHER PUBLICATIONS

International Search Report issued Aug. 17, 2021 in PCT/JP2021/022102, filed on Jun. 10, 2021, citing documents 1 & 16-18 therein, 5 pages (with English Translation).

*Primary Examiner* — David Luo
(74) *Attorney, Agent, or Firm* — Oblon, McClelland, Maier & Neustadt, L.L.P.

(57) ABSTRACT

A drive equipment includes a transformer, a power converter, and a control system. The transformer is configured with a primary winding and a secondary winding, and a winding of an electric motor is connected to the secondary winding. The power converter causes a current to flow through the primary winding of the transformer. The control system performs constant current control on the power converter during a period of a first stage after startup of the electric motor is instructed, to reduce a variation in a current flowing through the primary winding of the transformer, and controls the power converter through variable voltage variable frequency control of the electric motor in a second stage after the first stage.

10 Claims, 9 Drawing Sheets

(51) Int. Cl.
*H02M 1/36* (2007.01)
*H02P 27/06* (2006.01)

(58) Field of Classification Search
CPC .. H02M 1/40; H02P 27/06; H02P 1/30; H02P 27/04
USPC ................ 318/801, 800, 799, 798, 767, 727
See application file for complete search history.

(56) References Cited

FOREIGN PATENT DOCUMENTS

| | | |
|---|---|---|
| JP | 7-123782 A | 5/1995 |
| JP | 9-223628 A | 8/1997 |

\* cited by examiner

DRIVE EQUIPMENT AND CONTROL METHOD

TECHNICAL FIELD

The embodiments of the present invention relate to a drive equipment and a control method.

BACKGROUND ART

There is a drive equipment in which a transformer is provided between an output of a power converter that drives an electric motor and the electric motor, and an output voltage of the power converter is increased or decreased by the transformer. An actual transformer is influenced by magnetic saturation due to DC bias magnetism or the like, or influenced by a residual magnetic flux, in addition to an ideal conversion operation. A protection circuit of the power converter is operated due to the influence of the magnetic saturation and the residual magnetic flux to stop the drive equipment, for example, thereby making drive control of the drive equipment unstable.

CITATION LIST

Patent Document

[Patent Document 1]
  Japanese Unexamined Patent Application, First Publication No. 09-223628

SUMMARY OF INVENTION

Technical Problem

A problem to be solved by the present invention is to provide a drive equipment and a control method capable of further improving the stability of drive control in a power converter that drives an electric motor via a transformer.

Solution to Problem

A drive equipment of an embodiment includes a transformer, a power converter, and a control system. The transformer is configured with a primary winding and a secondary winding, and an electric motor is connected to the secondary winding. The power converter causes a current to flow through the primary winding of the transformer. The control system performs constant current control on the power converter so that a current at a predetermined desired frequency flows from the power converter to the primary winding of the transformer during a period of a first stage after startup of the electric motor is instructed, to reduce a variation in a current flowing through the primary winding of the transformer, and to control the power converter through variable voltage variable frequency control of the electric motor in a second stage after the first stage.

DESCRIPTION OF EMBODIMENTS

Hereinafter, a drive equipment and a control method of an embodiment will be described below with reference to the drawings. In the following description, configurations having the same or similar functions are denoted by the same reference signs. Repeated descriptions of these configurations may be omitted. Being electrically connected may be simply referred to as being "connected". In the following description, "orthogonal" includes substantially perpendicular. A case of "the same size" includes a case of substantially orthogonal.

Figure 1:
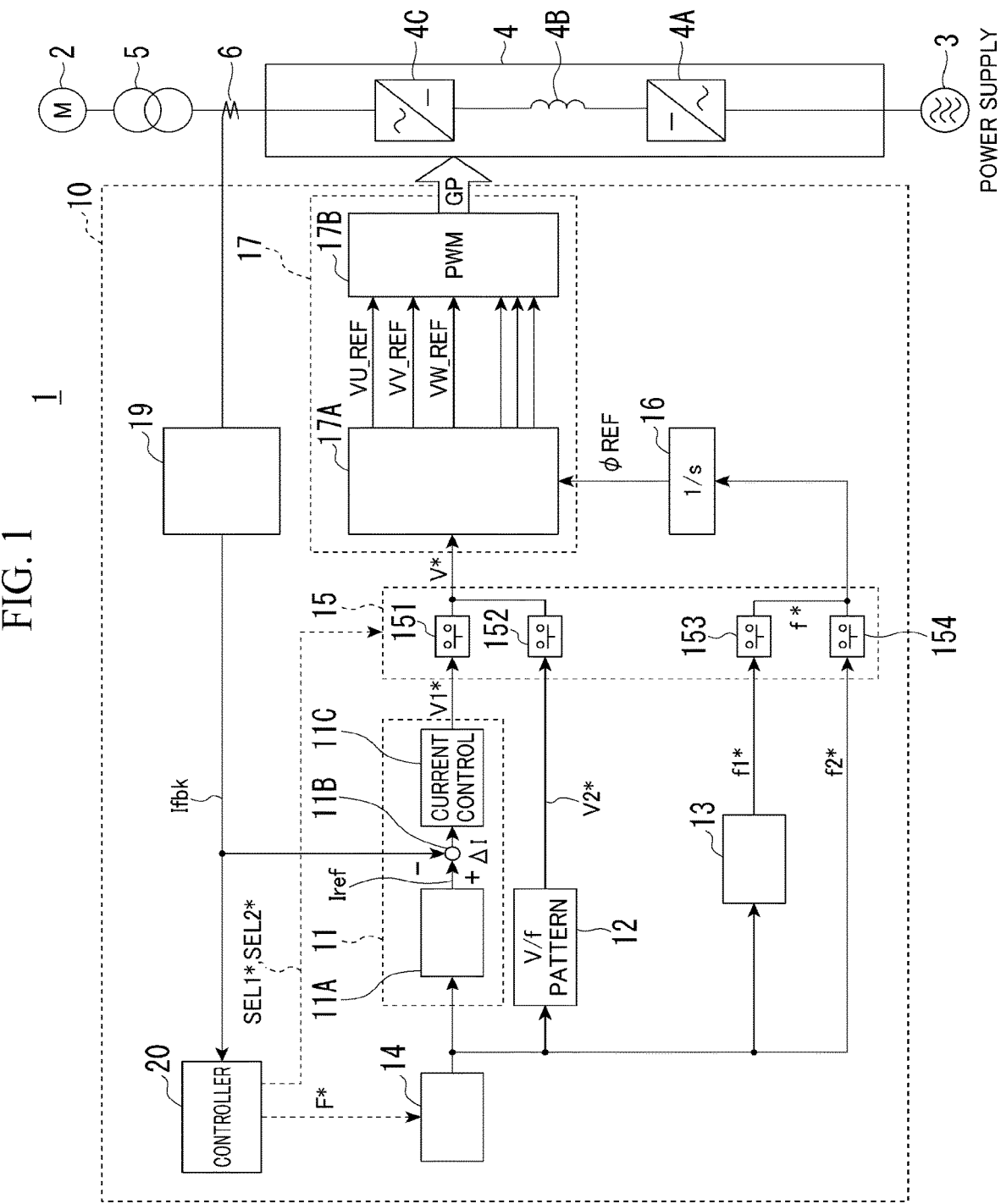
FIG. 1 is a configuration diagram of a drive equipment according to an embodiment.
Figure 2:
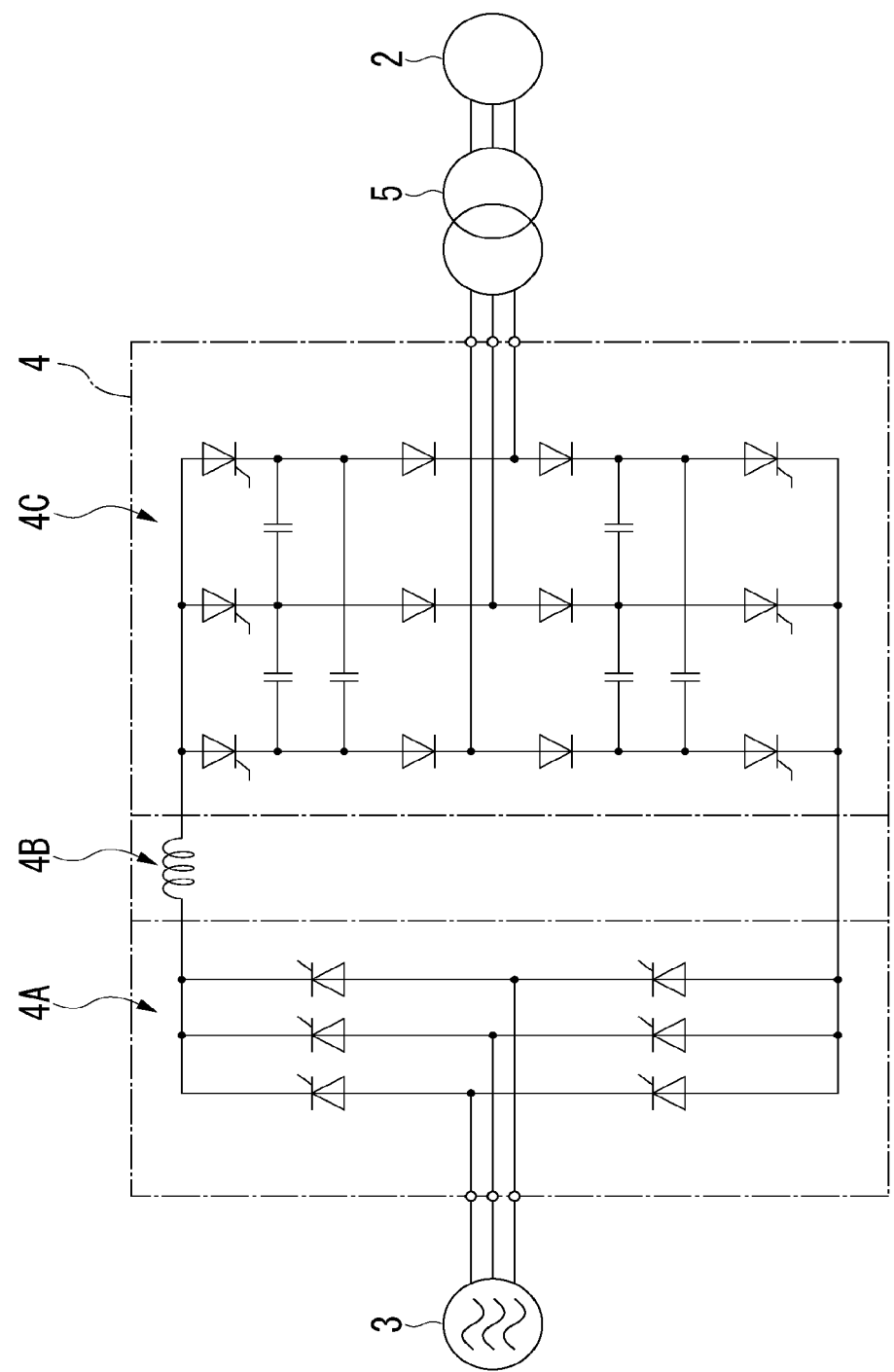
FIG. 2 is a configuration diagram of a power converter of the embodiment.

FIG. 1 is a configuration diagram of a drive equipment 1 of an embodiment. FIG. 2 is a configuration diagram of a power converter 4 of the embodiment.

The drive equipment 1 includes, for example, a power converter 4, a transformer 5, and a control system 10.

The power converter 4 includes, for example, a converter 4A, a reactor 4B, and an inverter 4C. The inverter 4C is an example of a power converter that functions as a current type inverter circuit. Details regarding this will be described below.

A power supply 3 supplies AC power to the power converter 4. The power converter 4 converts the AC power supplied from the power supply 3 and uses the resultant power to drive an electric motor 2. A mechanical load is connected to an output shaft of the electric motor 2, and rolls as the output shaft of the electric motor 2 rotates. The electric motor 2 is, for example, an induction motor.

The transformer 5 has a primary winding and a secondary winding. A winding of the electric motor 2 is connected to the secondary winding of the transformer 5. The power converter 4 causes a desired current to flow through the primary winding of the transformer 5 through switching between power semiconductor devices.

The current detector 6 includes a current sensor. The current detector 6 is provided, for example, on a wiring between an output of the power converter 4 and the primary winding of the transformer 5. The current detector 6 detects an output current of the inverter 4C of the power converter 4, that is, a current flowing through the primary winding of the transformer 5. A current index value indicating a result of detecting the current is supplied to the control system 10. For example, the output current of the power converter 4 corresponds to a current (line current) flowing through each phase of the primary winding of the transformer 5. The current detector 6 may be provided, for example, in a DC link that connects the converter 4A to the inverter 4C. In this case, the current detector 6 detects a current flowing through the DC link. The following description will be based on the former example illustrated in the drawings.

The control system 10 is formed to include a feedback control system for current control based on a result of detecting the output current of the power converter 4. For example, the control system 10 performs constant current control on the power converter 4 on the basis of the detection result of the output current of the power converter 4 during a period of a first stage related to the startup of the electric motor 2, thereby reducing a variation in the current flowing through the primary winding of the transformer 5. Thereafter, the control system 10 controls the power converter 4 so that variable frequency variable voltage control (hereinafter referred to as VVVF control) is performed on the electric motor 2 in a second stage after the first stage. As the first stage, a preparatory period for controlling the electric motor 2 through the VVVF control in the second stage is provided over a predetermined period. For example, the current control may be realized by the converter 4A, and the VVVF control may be realized by the inverter 4C.

A more specific example of the control system 10 is shown. For example, the control system 10 includes a first voltage reference generator 11, a second voltage reference generator 12, a first frequency reference generator 13, a frequency reference generator 14, a switch unit 15, and an integrator 16, a control signal generation unit 17, a converter 19, and a controller 20.

The integrator 16 integrates a frequency reference f*, which will be described below, to calculate a secondary magnetic flux angle φREF on the basis of the frequency reference f*. The secondary magnetic flux angle φREF is used as a reference phase for control of the electric motor 2.

The control signal generation unit 17 generates a control signal GP, gate pulse, for switching between power semiconductor devices of respective phases included in the power converter 4, which will be described below, on the basis of the voltage reference V* and the secondary magnetic flux angle φREF.

For example, the control signal generation unit 17 includes a coordinate conversion unit 17A and a PWM control unit 17B.

The coordinate conversion unit 17A converts the voltage reference V* into a three-phase coordinate system to generate a voltage reference for each phase. For example, the coordinate conversion unit 17A converts the voltage reference V* into a three-phase coordinate system using the secondary magnetic flux angle φREF of the electric motor 2 on the basis of a voltage reference V* of a scalar value and the secondary magnetic flux angle φREF to generate a voltage reference for each phase of the converter 4C. Voltage references VU_REF, VV_REF, and VW_REF are voltage references that define voltages of a U-phase, a V-phase, and a W-phase, respectively. An example of this conversion processing is shown in Equation (1). The same applies to the control of the converter 4A.

$$(VU\_REF, VV\_REF, VW\_REF) = V^* \times (\sin \phi REF, \sin(\phi REF - 2\pi/3), \sin(\phi REF - 4\pi/3)) \quad (1)$$

The PWM control unit 17B generates the control signal GP for switching between the power semiconductor devices of the respective phases under pulse width modulation (PWM) control using a predetermined carrier signal on the basis of the voltage reference. For example, the PWM control unit 17B obtains voltage references VV_REF, VV_REF, and VW_REF, and generates the control signal GP for switching between the power semiconductor devices of the respective phases of the converter 4C under the PWM control using the predetermined carrier signal on the basis of the voltage references VV_REF, VV_REF, and VW_REF. The PWM control unit 17B supplies the control signal GP to the respective power semiconductor devices of the respective phases to switch the power semiconductor devices of the respective phases of the converter 4C. In the control of the converter 4A, the control may also be performed on each of three phases, as in the control of the inverter 4A.

The converter 19 generates a current feedback Ifbk on the basis of the current index value detected by the current detector 6. The converter 19 generates, for example, the current feedback Ifbk corresponding to a magnitude of a current with two phases or three phases detected by the current detector 6.

The first voltage reference generator 11 generates a first voltage reference V1* that is used as a first-stage voltage reference related to startup of the electric motor 2. The first voltage reference generator 11, for example, determines a value of the first voltage reference V1* on the basis of a frequency reference f2*, which will be described below. There is a correlation between the value of the first voltage reference V1* and a value of the frequency reference f2*.

For example, the first voltage reference generator 11 includes a startup current pattern generation unit 11A, a subtractor 11B, and a current controller 11C.

The startup current pattern generation unit 11A generates a startup current pattern for defining a magnitude of a current value in a startup stage (a first stage). A current value indicated by the startup current pattern may be defined as a predetermined fixed value, or may be defined such that a value changes over time after the start of the startup. The startup current pattern generation unit 11A supplies a current reference Iref based on the startup current pattern to the subtractor 11B.

The subtractor 11B subtracts the current feedback Ifbk based on the current value detected by the current detector 6 from the current reference Iref supplied from the startup current pattern generation unit 11A to generate a current deviation ΔI, which is a deviation between the current reference Iref and the current feedback Ifbk, and supplies the current deviation ΔI to the current controller 11C.

The current controller 11C obtains the current deviation ΔI, calculates the voltage reference V1* so that the current deviation ΔI becomes small or zero, and outputs the voltage reference V1* as the voltage reference. For example, the current controller 11C calculates the voltage reference V1* through proportional integral calculation using a proportional gain KP and an integral gain KI for the current deviation ΔI.

The first frequency reference generator 13 generates a first frequency reference f1* defined such that a current for demagnetizing the electric motor 2 flows through the winding of the electric motor 2. For example, the first frequency reference generator 13 is used in the startup stage (the first stage). The first frequency reference generator 13 generates a signal (frequency reference f1*) including frequency components according to a startup frequency pattern for defining a frequency of a current flowing through the winding of the electric motor 2. A frequency indicated by the startup frequency pattern may be defined as a predetermined fixed frequency, or may be defined to change over time after the start of the startup. More specifically, the frequency indicated by the startup frequency pattern may be defined to gradually decrease over time after the start of the startup.

The first frequency reference generator 13 supplies the first frequency reference f1* to the switch unit 15 on the basis of the startup frequency pattern.

The second voltage reference generator 12 generates a second voltage reference V2* for variable speed control of the electric motor 2 as a voltage reference. For example, the second voltage reference generator 12 obtains the frequency reference f2* generated by the frequency reference generator 14, which will be described below, and generates, as the voltage reference, the second voltage reference V2* for the variable speed control of the electric motor 2 on the basis of the frequency reference f2*. The second voltage reference generator 12 has, for example, a conversion rule for constant V/f control as a conversion rule indicating a relationship between the frequency reference f2* and the second voltage reference V2*. This is simply called a V/f pattern.

The frequency reference generator 14 generates the frequency reference f2* for the variable speed control of the electric motor 2. For example, the frequency reference generator 14 obtains a frequency F* designated by the controller 20, which will be described below, and generates the frequency reference f2* on the basis of the frequency F*. The frequency reference generator 14 includes a table for quantizing the frequency F* designated by the controller 20 and generating the frequency reference f2*. This table is set to output the frequency reference f2* indicating a larger quantized value as the frequency F* increases. This conversion characteristic may be appropriately determined on the basis of design results. The quantization indicates conversion to a discrete value whose granularity of possible value is coarser than the granularity of a value of an input variable on the basis of the value of the input variable, or conversion to a value defined at a predetermined granularity on the basis of a continuously changing input value.

The switch unit 15 includes switches 151 to 154, for example. The switch 151 (a first switch) enables the first voltage reference V1* as the voltage reference V* under the control of the controller 20. The switch 152 (a second switch) enables the second voltage reference V2* as the voltage reference V* under the control of the controller 20. The switch 153 (a third switch) enables the first frequency reference f1* as the frequency reference f* under the control of the controller 20. The switch 154 (a fourth switch) enables the frequency reference f2* as the frequency reference f* under the control of the controller 20.

The controller 20 uses the first voltage reference V1* and the first frequency reference f1* in the first stage related to the time of the startup of the electric motor 2 in response to a start request to generate control commands SEL1* and SEL2* for starting the second stage after the start of the first stage and using the second voltage reference V2*.

For example, the controller 20 controls the switches 151 to 154 so that switching is performed between enabling and disabling the switches 151 and 153 using the control command SEL1* during the period of the first stage, and switching is performed between enabling and disabling the switches 152 and 154 using the control command SEL2* during the period of the second stage. Enabling each switch means, for example, bring each switch into an ON state.

Next, the power converter 4 will be described with reference to FIG. 2.

The power converter 4 includes the converter 4A, the reactor 4B, and the inverter 4C.

The converter 4A is, for example, a converter including a plurality of thyristors or diodes. The converter 4A converts the received AC power into DC power through rectification to generate a DC voltage. The converter 4A performs current control on the basis of this. The reactor 4B is provided in the DC link that connects the converter 4A to the inverter 4C. The inverter 4C converts the DC power supplied through the DC link into AC power having a voltage and frequency required for speed control of the electric motor 2. The inverter 4C is configured by, for example, bridge-connecting a plurality of switching elements. The plurality of switching elements are subjected to ON or OFF control by the control system 10.

For example, the inverter 4C illustrated in FIG. 2 is an example of a series diode type inverter configured using a thyristor as a switching element. A leg corresponding to each phase of the inverter 4C includes two thyristors and two diodes, which are connected in series so that the two diodes are interposed between the two thyristors. The thyristor-diode connection points of each leg are connected to each other by a commutation capacitor. The commutation occurs when the thyristor is reverse biased by a voltage according to charge stored in the commutation capacitor. A circuit configuration of the inverter 4C illustrated in FIG. 2 is not limited thereto, and other circuit configurations may be applied appropriately. For example, the inverter 4C may be a two-level inverter or may be a three-level inverter. The present embodiment can be applied regardless of a scheme and circuit configuration of the inverter.

Next, constant current drive of the embodiment will be described with reference to FIGS. 3A to 3C.

Figure 3A:
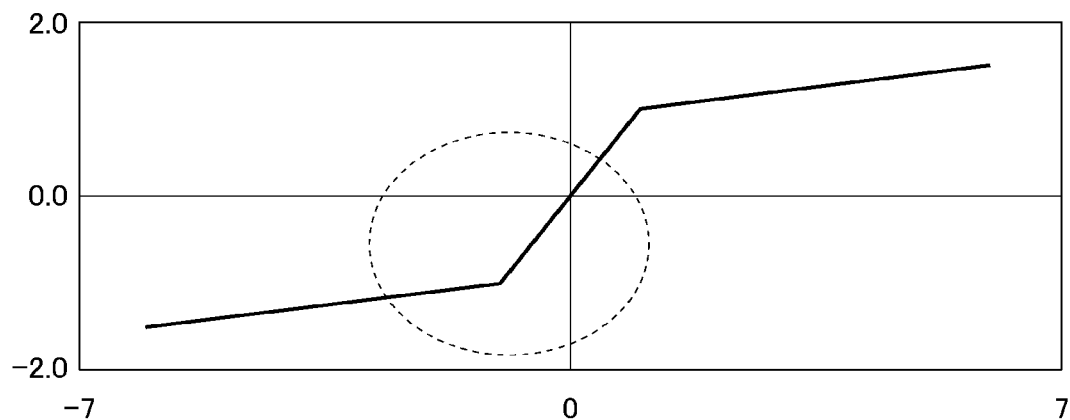
FIG. 3A is a diagram illustrating BH characteristics of a transformer of the embodiment.

FIG. 3A is a diagram illustrating BH characteristics of the transformer 5 of the embodiment. FIG. 3B is a diagram illustrating an excitation state of the transformer 5 when the transformer 5 is excited using a voltage source as a comparative example. FIG. 3C is a diagram illustrating an excitation state of the transformer 5 when the transformer 5 of the embodiment is excited using a current source.

The BH characteristics are generally indicated by a closed curve with hysteresis. In an example illustrated in FIG. 3A, a result of performing polygonal line approximation on an entire region using three line segments with the hysteresis of the BH characteristics omitted in a relationship between a magnetic field H on a horizontal axis and a magnetic flux density B on a vertical axis is shown. Although the BH characteristics according to this approximation does not show occurrence of residual magnetic flux, the residual magnetic flux may occur because the actual transformer 5 has hysteresis characteristics.

As a result of the approximation illustrated in FIG. 3A, a slope of a line segment in a saturation region in which a value of the magnetic field H is relatively large is loosened as compared with a slope (magnetic permeability) of a line segment in a non-saturation region in which the value of the magnetic field H is relatively small, due to magnetic saturation. An event that can occur when excitation Occurs near a boundary between the non-saturation region and the saturation region will be described.

Figure 3B:
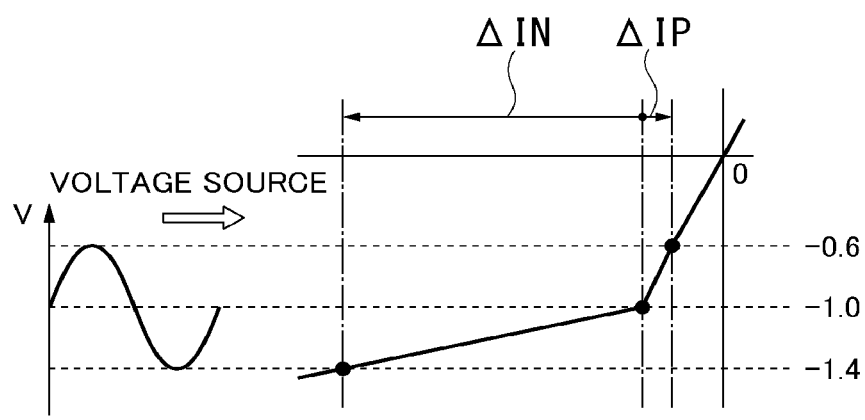
FIG. 3B is a diagram illustrating an excitation state of a transformer when a transformer is excited using a voltage source as a comparative example.

In the comparative example illustrated in FIG. 3B, the transformer 5 is excited with a voltage having a sinusoidal voltage waveform from the voltage source, so that a current corresponding to the BH characteristics (a BH characteristic curve) flows through the winding of the transformer 5. A range of variation in the current is indicated by an arrow. In this voltage waveform, a variation width $\Delta IN$ of the current during a period showing a negative voltage shows a larger value than a variation width $\Delta IP$ of the current during a period showing a positive voltage. Thus, the variation width $\Delta IP$ and the variation width $\Delta IN$ are unbalanced, and the amplitude of the current becomes asymmetric with respect to a polarity thereof.

In the case of this comparative example, a frequency (angular velocity) at the time of startup of the electric motor 2 is maintained at a relatively small value under VVVF control. When a driving method of the comparative example is applied and control is performed for excessive acceleration, an unbalanced voltage is generated at the time of the startup, and saturation of a magnetic flux easily occurs according to a voltage×time area. Further, neither a magnitude of a residual magnetic flux in a core of the transformer at the time of its startup nor a position within the BH characteristics are known. Therefore, there is concern that an overcurrent is generated due to magnetic saturation in relation to a magnitude of the residual magnetic flux. A gapped transformer may be applied in order to prevent such an event from occurring. The gapped transformer tends to be larger in size than an ungapped transformer.

In particular, for an application to a mechanical load with a large startup torque, it is necessary to increase a current at the time of the startup, and a voltage may be boosted under VVVF control. This further causes magnetic saturation of the transformer. In a method of the comparative example, when such a mechanical load with a large startup torque is driven, an overcurrent is easily generated, and countermeasures such as providing a larger transformer are required.

The residual magnetic flux gradually disappears due to a voltage drop caused by a resistor of an electric circuit. In the case of a startup method of the comparative example, it takes time to apply an alternating magnetic flux larger than a predetermined number of times to the transformer because excitation occurs at a relatively low frequency corresponding to a speed at the time of the startup of the electric motor. Therefore, in the startup method of the comparative example, it is difficult to efficiently reduce the residual magnetic flux within a relatively short time required at the time of startup of the electric motor, for example.

Figure 3C:
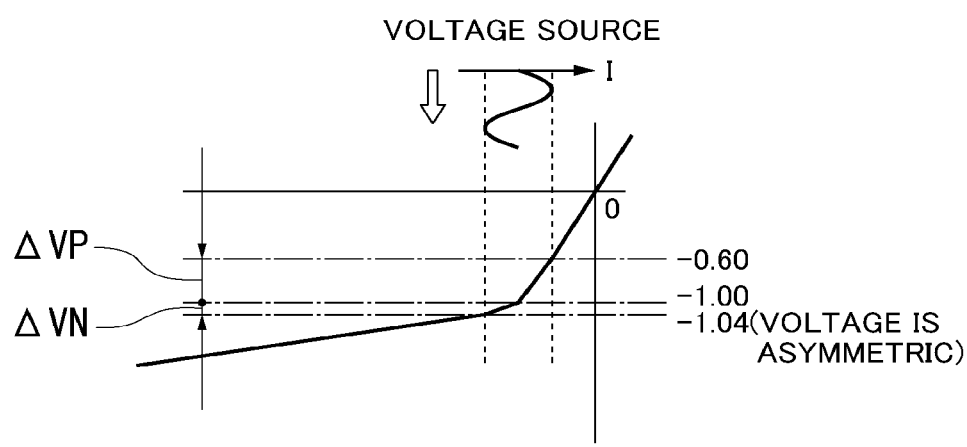
FIG. 3C is a diagram illustrating an excitation state of the transformer when the transformer is excited using a current source of the embodiment.

In the case of the present embodiment illustrated in FIG. 3C, the transformer 5 is excited with a current having a sinusoidal current waveform from the current source, such that a voltage corresponding to the BH characteristics (the BH characteristics curve) is applied to the winding of the transformer 5. A range of a variation in the voltage is indicated by an arrow. In this current waveform, a variation width $\Delta VN$ of the voltage during a period showing a negative voltage is smaller than a variation width $\Delta VP$ of the voltage during a period showing a positive current flowing in a forward direction. This imbalance between the variation width $\Delta VP$ and the variation width $\Delta VN$ causes an amplitude of the voltage to be asymmetric with respect to a polarity of the voltage. In this case, a center of the variation width obtained by combining the variation width $\Delta IP$ and the variation width $\Delta IN$ is located on the saturation region side with respect to a point indicating a reference voltage of the voltage waveform. That is, a position of the center moves by a large amount in a magnetic saturation decrease direction, and does not move in a magnetic saturation increase direction. As a result, this acts in a direction in which an asymmetrical amount of the residual magnetic flux disappears.

Figure 4:
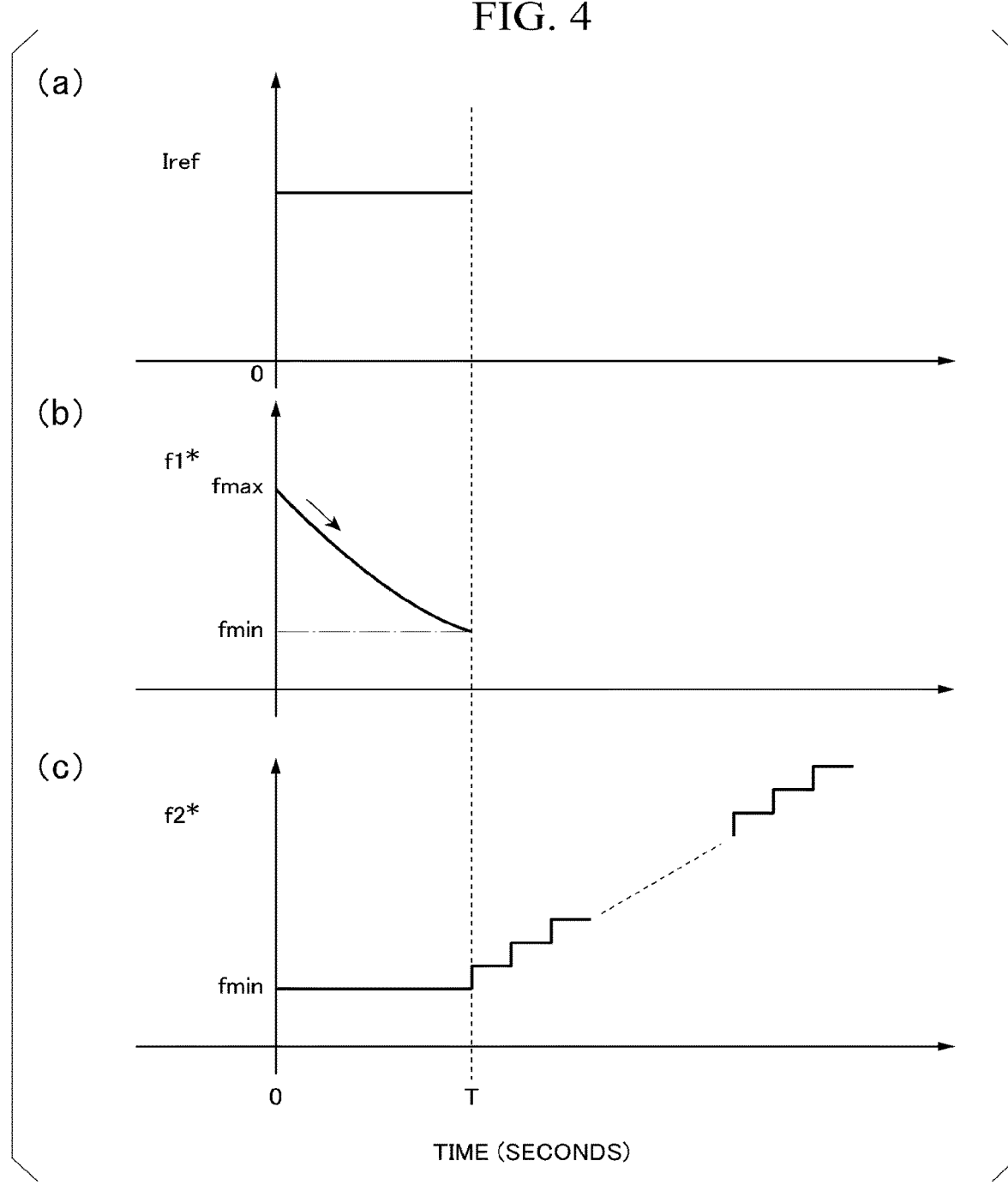
FIG. 4 is a diagram illustrating control in a startup stage of the drive equipment according to the embodiment.

Control of the startup stage of the drive equipment 1 of the embodiment will be described with reference to FIG. 4. FIG. 4 is a diagram illustrating control in the startup stage of the drive equipment 1 of the embodiment. (a) of FIG. 4 illustrates an example of the startup current pattern. (b) of FIG. 4 illustrates an example of the startup frequency pattern. (c) of FIG. 4 illustrates an example of the frequency reference f2* generated by quantizing the frequency F* using the table.

The startup current pattern illustrated in (a) of FIG. 4 defines, for example, the current reference Iref that is applied to a stage from the start of the startup to the elapse of time T (hereinafter simply referred to as a first stage). For example, the current reference Iref is determined to be a constant value or a value relatively close to the constant value. A current reference Iref of the value relatively close to the constant value is collectively referred to simply as a constant current reference Iref.

The startup frequency pattern illustrated in (b) of FIG. 4 defines the first frequency reference f1* in the first stage. For example, the following characteristics are given to the current flowing through the primary winding of the transformer 5 in the first stage using the first frequency reference f1* defined by the startup frequency pattern, so that the transformer 0.5 may be demagnetized.

As a first characteristic of the first frequency reference f1*, it is defined that, for example, frequency components with a frequency higher than a predetermined frequency are included in frequency components indicated by the first frequency reference f1*. The "predetermined frequency" may be a frequency higher than a speed at which the electric motor 2 is idled at the time of startup of the electric motor 2.

As a second characteristic of the first frequency reference f1*, it is defined that, for example, a maximum value of the frequency defined by the first frequency reference f1* is generated immediately after the start of the period of the first stage (immediately after startup).

As a third characteristic of the first frequency reference f1*, it is defined that, for example, the maximum value of the frequency defined by the first frequency reference f1* is generated during the period of the first stage, and then, the frequency defined by the first frequency reference f1* monotonically decreases over time.

As a fourth characteristic of the first frequency reference f1*, it is defined that, for example, a minimum value of the frequency defined by the first frequency reference f1* reaches a predetermined value, which is determined in advance, during the period of the first stage.

One or more characteristics among the first to fourth characteristics may be assigned as characteristics of the first frequency reference f1*.

For example, the control system 10 controls the inverter 4C so that the current for demagnetizing the transformer 5 flows through the primary winding of the transformer 5 during the period of the first stage. The control system 10 controls the inverter 4C so that a current for VVVF control of the electric motor 2 flows through the primary winding of the transformer 5 during the period of the second stage.

In this case, the control system 10 can use the first frequency reference f1* having the first characteristic to control the inverter 4C so that frequency components having a frequency higher than a predetermined frequency are included in the current flowing through the primary winding of the transformer 5 to demagnetize the transformer 5.

The control system 10 can use the first frequency reference f1* having the second characteristic to control the inverter 4C so that a maximum value of a frequency of the current flowing through the primary winding of the transformer 5 is generated immediately after the start of the period of the first stage.

The control system 10 can use the first frequency reference f1* having the third characteristic to control the inverter 4C so that the frequency monotonically decreases over time after the maximum value of the frequency of the current flowing through the primary winding of the transformer 5 to demagnetize the transformer 5 is generated during the period of the first stage.

The control system 10 can use the first frequency reference f1* having the fourth characteristic to control the inverter 4C so that a minimum value of the frequency of the current flowing through the primary winding of the transformer 5 to demagnetize the transformer 5 is generated in a second half of the period of the first stage. Further, the control system 10 may initiate the second stage after the minimum value of the frequency of the current flowing through the primary winding of the transformer 5 to demagnetize the transformer 5 is generated during the period of the first stage.

Hereinafter, a case of the assignment as the characteristics of the first frequency reference f1* so that all of the first to fourth characteristics are satisfied will be described.

Figure 5A:
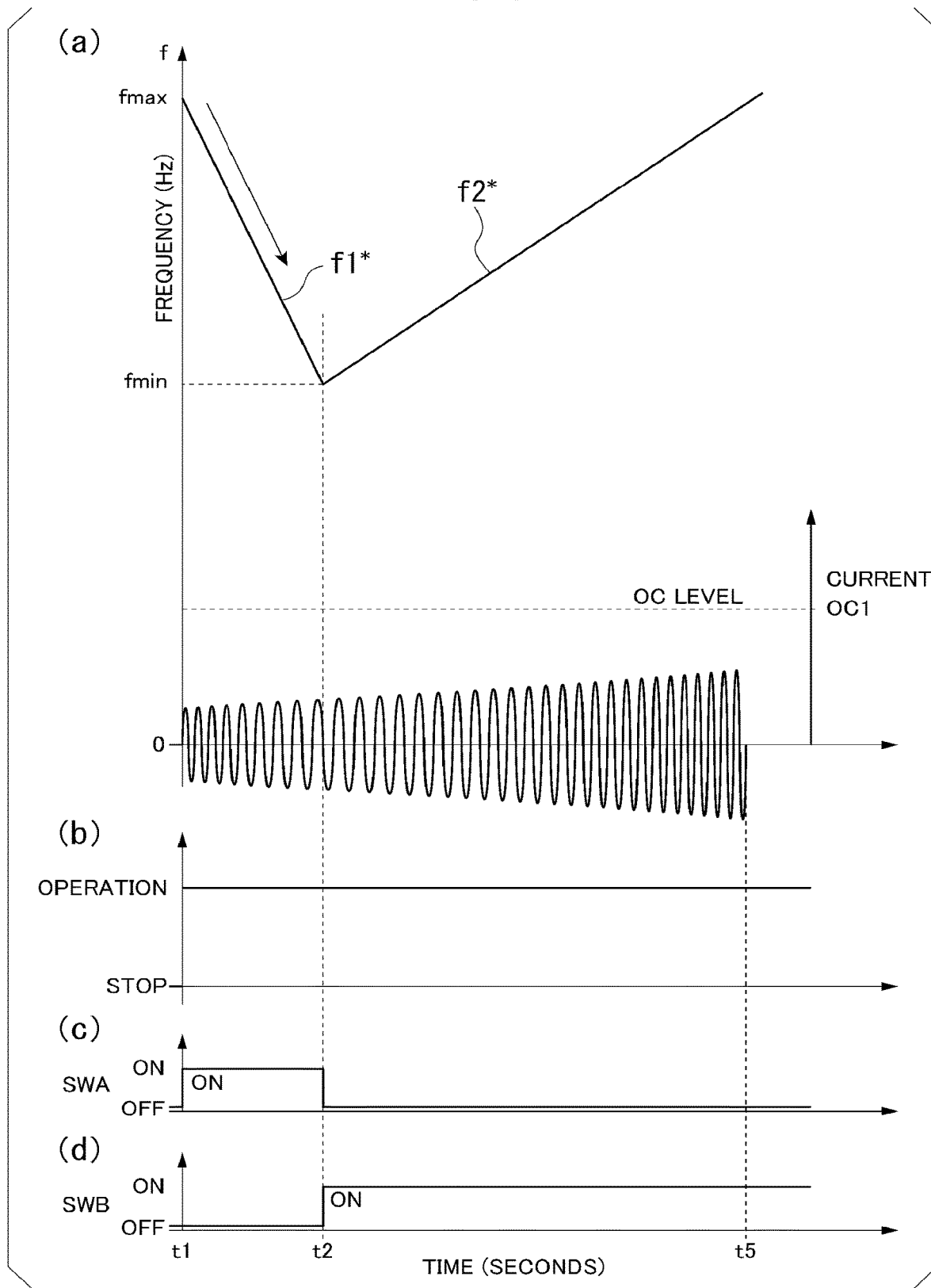
FIG. 5A is a timing chart illustrating an operation in the startup stage of the drive equipment of the embodiment.
Figure 5B:
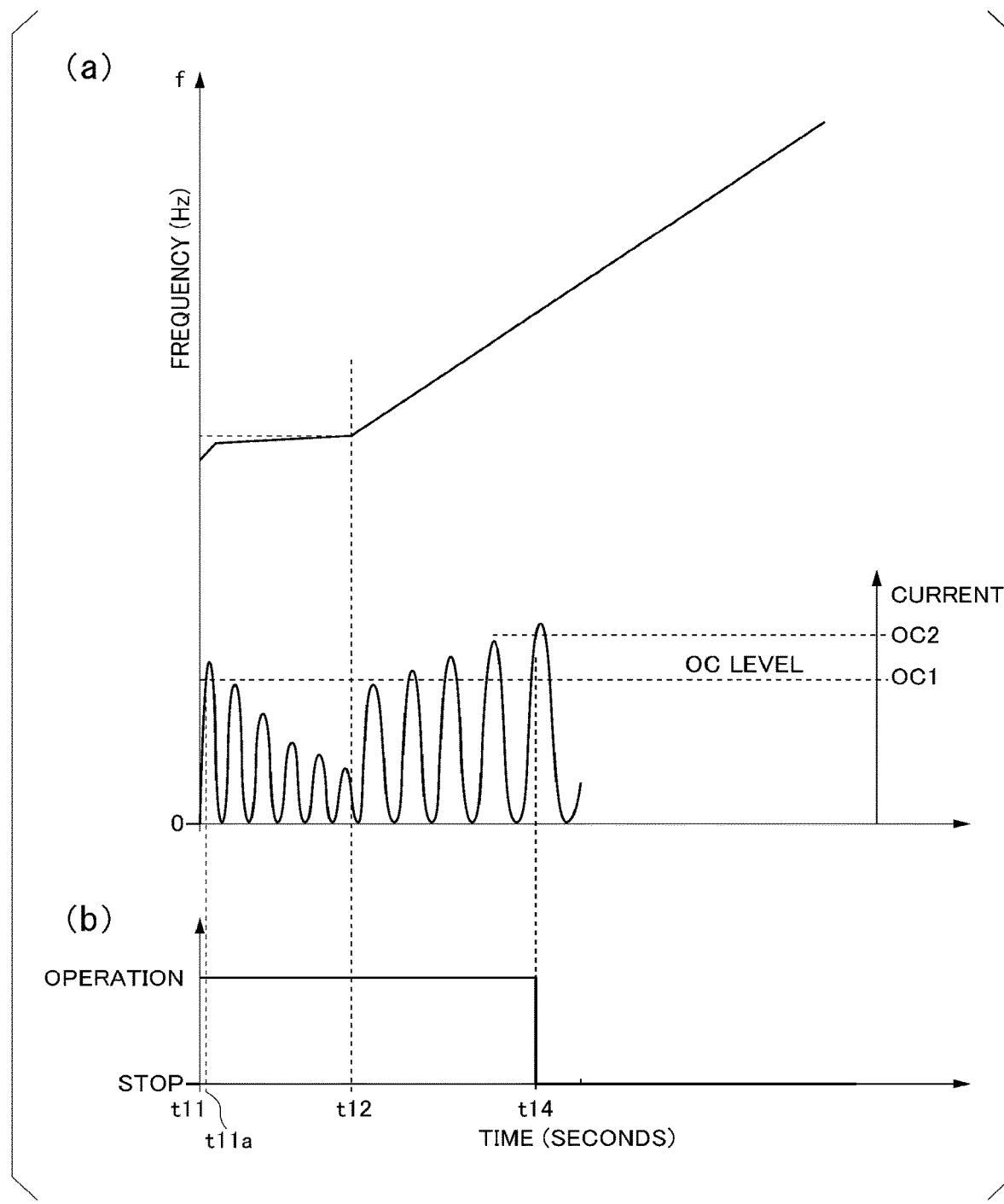
FIG. 5B is a timing chart illustrating an operation in a startup stage of a drive equipment in the comparative example.

An operation in the startup stage of the drive equipment 1 of the embodiment will be described with reference to FIGS. 5A and 5B. FIG. 5A is a timing chart illustrating the operation in the startup stage of the drive equipment 1 of the embodiment. FIG. 5B is a timing chart illustrating the operation in the startup stage of the drive equipment 1 of the comparative example.

In FIG. 5A, (a) the output current of the inverter 4C and a frequency f thereof, (b) an operating state of the inverter 4C, (c) states of the switches 151 and 153, and (d) states of the switches 152 and 154 are illustrated in order from the top.

In an initial stage up to time t1, there is no current (output current) flowing by the inverter 4C, and the electric motor 2 is in a stopped state. All of the switches 151 to 154 are in an OFF state.

At time t1, the controller 20 sends control signals for controlling the frequency reference generator 14 and the switch unit 15 to the frequency reference generator 14 and the switch unit 15, and starts the operation of the drive equipment 1 that is in the stopped state and brings the operation of the drive equipment 1 into an operating state, as illustrated in (b) in FIG. 5A. The controller 20 brings the switches 151 and 153 (collectively referred to as SWA)) to an ON state as illustrated in (c) of FIG. 5A, and maintains the switches 152 and 154 (collectively referred to as SWB) in the OFF state as illustrated in (d) of FIG. 5A.

For example, the controller 20 sends the frequency F* for designating a desired rotation speed of the electric motor 2 to the frequency reference generator 14. The controller 20 sends a selection signal for selecting a desired signal (a first signal) to the switch unit 15, and switches a state of the switch unit 15 to the startup stage. For example, the controller 20 maintains the state determined as described above until time t2.

The frequency reference generator 14 receives the supply of the frequency F*, generates the frequency reference f2* according to the frequency F* by referring to the table, and supplies this frequency reference f2* to the first voltage reference generator 11, the first frequency reference generator 13, the second voltage reference generator 12, and the switch unit 15.

When the first voltage reference generator 11 receives the supply of the frequency reference f2*, the first voltage reference generator 11 generates the current reference Iref based on the startup current pattern for defining the magnitude of the current value in the startup stage (the first stage) using the startup current pattern generation unit 11A. Further, the current controller 11C obtains the current deviation ΔI, which is the deviation between the current reference Iref and the current feedback Ifbk, and calculates the voltage reference V1* on the basis of the current deviation ΔI. The first voltage reference generator 11 outputs this voltage reference V1*. The voltage reference V1* is used as the voltage reference V*.

When the first frequency reference generator 13 receives the supply of the frequency reference f2*, the first frequency reference generator 13 generates a frequency index f1* based on the startup frequency pattern and supplies the frequency index f1* to the switch unit 15. For example, the startup frequency pattern may be determined in advance and tabulated. The startup frequency pattern defines a magnitude of the frequency f in the startup stage (the first stage). For example, the frequency index f1* that monotonically decreases over time from a frequency fmax to a frequency fmin after an operation starts is defined as the startup frequency pattern. This startup frequency pattern can also be defined as a function of time. A frequency thereof may be associated with the frequency reference f2* and a correlation may be determined in advance so that a value of the frequency index f1* changes.

The switch unit 15 is set so that a signal for a startup stage is enabled under the above control. Accordingly, the frequency index f1* is supplied to the integrator 16. The integrator 16 integrates this frequency index f1* to generate the secondary magnetic flux angle φREF. Further, the voltage reference V* based on the voltage reference V1* and the secondary magnetic flux angle φREF based on the frequency index f1* are supplied to the control signal generation unit 17 under this control.

The control signal generation unit 17 generates the control signal GP that is based on the voltage reference V1* and the secondary magnetic flux angle φREF based on the frequency index f1* to control the inverter 4C of the power converter 4. The control signal generation unit 17 may generate, for example, the control signal GP based on a predetermined voltage reference or the voltage reference V1*, a detected voltage of the DC link, and a reference phase regarding an alternating current on the power supply 3 side to control the converter 4A of the power converter 4.

The above state continues until time t2.

For example, as illustrated in (a) of FIG. 5A, the frequency indicated by the frequency index f1* gradually decreases from the frequency fmax to the frequency fmin to be defined by the startup frequency pattern over time after the start of the startup between time t1 and time t2. A cycle of the current gradually lengthens according to this frequency change. An amplitude of the current during this period is adjusted to be constant under current control.

At time t2, the controller 20 sends control signals for controlling the frequency reference generator 14 and the switch unit 15 to the frequency reference generator 14 and the switch unit 15 to gradually increase the frequency to increase the speed of the electric motor 2, as illustrated in (a) of FIG. 5A.

In this case, the controller 20 brings the switches 151 and 153 to the OFF state as illustrated in (c) of FTG. 5A, and brings the switches 152 and 154 to the ON state as illustrated in (d) of FIG. 5A. Accordingly, outputs of the first voltage reference generator 11 and the first frequency reference generator 13 are separated from the subsequent stage, and output values thereof are disabled. Alternatively, outputs of the second voltage reference generator 12 and the frequency reference generator 14 are connected to the subsequent stage and output values thereof are enabled.

As described above, a frequency indicated by the frequency index f2* output by the frequency reference generator 14 gradually increases from the frequency fmin over time after time t2.

A magnitude of the second voltage reference V2* output by the second voltage reference generator 12 increases as the frequency indicated by the frequency index f2* increases, according to the V/f pattern of the second voltage reference generator 12.

As illustrated in FIG. 5A, the frequency indicated by the frequency index f2* increases, and a shaft output torque of the electric motor 2 also increases until time t5. An overcurrent exceeding a threshold value OC1 is not generated from the start of the operation at time t1 to time t5.

Next, a comparative example will be described with reference to FIG. 5B.

A configuration for suppressing an overcurrent is not provided in a configuration of this comparative example, as described above. Therefore, even when the frequency is set to be relatively low in a stage in which the operation starts at time t11, a current with positive and negative asymmetry is generated due to a relationship between a torque at the time of startup and the magnetic saturation of the transformer 5, and an amplitude of the current may also exceed the threshold value OC1 for overcurrent protection. For example, when the threshold value OC1 is exceeded at time t11a, it becomes necessary to stop an operation for the overcurrent protection.

Even when an overall configuration is reviewed and the threshold value OC1 for overcurrent protection can be increased to a threshold value OC2, an excessive current may flow due to a torque generated at the time of acceleration of the electric motor 2 when the residual magnetic flux is still relatively high at time t12 because the transformer is saturated. In such a case, it is necessary to stop the operation for overcurrent protection in a stage in which the threshold value OC2 is exceeded. It is possible to lower a probability that the operation will be stopped in this way, but it is difficult to suppress the occurrence of the operation stop.

As is clear from a result of a comparison with the comparative example, according to the embodiment, the transformer 5 includes the primary winding and the secondary winding, and a winding of the electric motor is connected to the secondary winding. The power converter 4 causes a current to flow through the primary winding of the transformer 5 through switching between the power semiconductor devices. The control system 10 performs constant current control on the power converter 4 during the period of the first stage related to the startup of the electric motor 2 to reduce a variation in the current flowing through the primary winding of the transformer 5, and controls the power converter 4 through the VVVF control of the electric motor 2 in the second stage after the first stage. This makes it possible to further improve the stability of the drive control of the power converter 4 that drives the electric motor 2 via the transformer 5. This power converter 4 may include the inverter 4C.

The control system 10 may reduce the current reference Iref of the current flowing through the primary winding of the transformer 5 during the period of the first stage and reduce the frequency of the current flowing through the primary winding of the transformer 5 during the period of the first stage, over time. This makes it possible to cause an AC current for reducing the residual magnetic flux of the transformer 5 in the first stage to flow in more cycles in a relatively short time, and to reduce the residual magnetic flux in a shorter time.

The control system 10 can limit a current during the period of the first stage by causing the power converter 4 to function under constant current control on the basis of the current feedback Ifbk, which is the current detection result, and the current reference Iref, which is an index of the current value, during the period of the first stage.

The control system 10 controls the power converter 4 so that a current for demagnetizing the transformer 5 flows through the primary winding of the transformer 5 during the period of the first stage. Further, the control system 10 controls the power converter 4 so that the current for VVVF control of the electric motor 2 flows through the primary winding of the transformer 5 during the period of the second stage. This makes it possible to drive the electric motor 2 through the VVVF control after the residual magnetic flux of the transformer 5 is reduced in the first stage. It is preferable for the residual magnetic flux of the transformer 5 to be as small as possible, and an overcurrent is difficult to generate when the residual magnetic flux of the transformer 5 is reduced so that the electric motor 2 can be driven out of the saturation region of the transformer 5 in a stage in which the first stage ends.

The control system 10 may start the second stage after the minimum value of the frequency of the current flowing through the primary winding of the transformer 5 to demagnetize the transformer 5 reaches a predetermined value that is determined in advance during the period of the first stage.

With the control system 10, it is possible to reduce a risk of generation of an overcurrent due to the magnetic saturation of the transformer 5 by causing a relatively high frequency current to flow and gradually decreasing the frequency while causing the current to flow, and to reduce the residual magnetic flux of the transformer 5 in an initial stage at the time of startup of the electric motor 2. This eliminates the need to provide a transformer with an excessive rated capacity for countermeasures against the above risk.

Thus, a period in which current control is performed is provided in the initial stage at the time of the startup of the electric motor 2, so that, even when the startup torque is large, the risk of the generation of the overcurrent can be reduced and the electric motor can be started up with a relatively large current.

Second Embodiment

A second embodiment will be described. The current type inverter circuit is used in the case of the first embodiment shown above. In the present embodiment, a case in which a voltage type inverter circuit is used instead of the current type inverter circuit will be described.

Figure 6A:
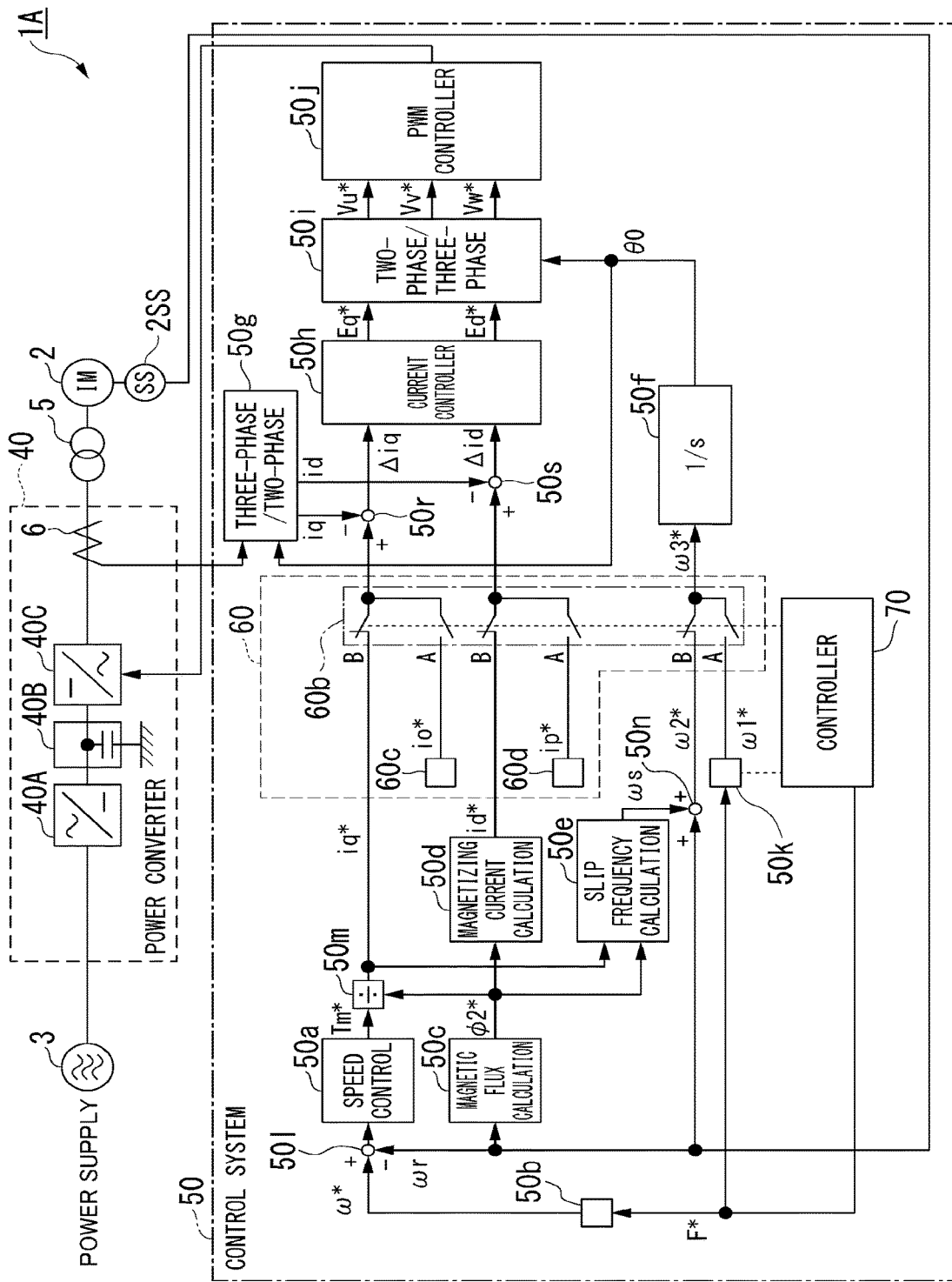
FIG. 6A is a configuration diagram of a drive equipment according to a second embodiment.
Figure 6B:
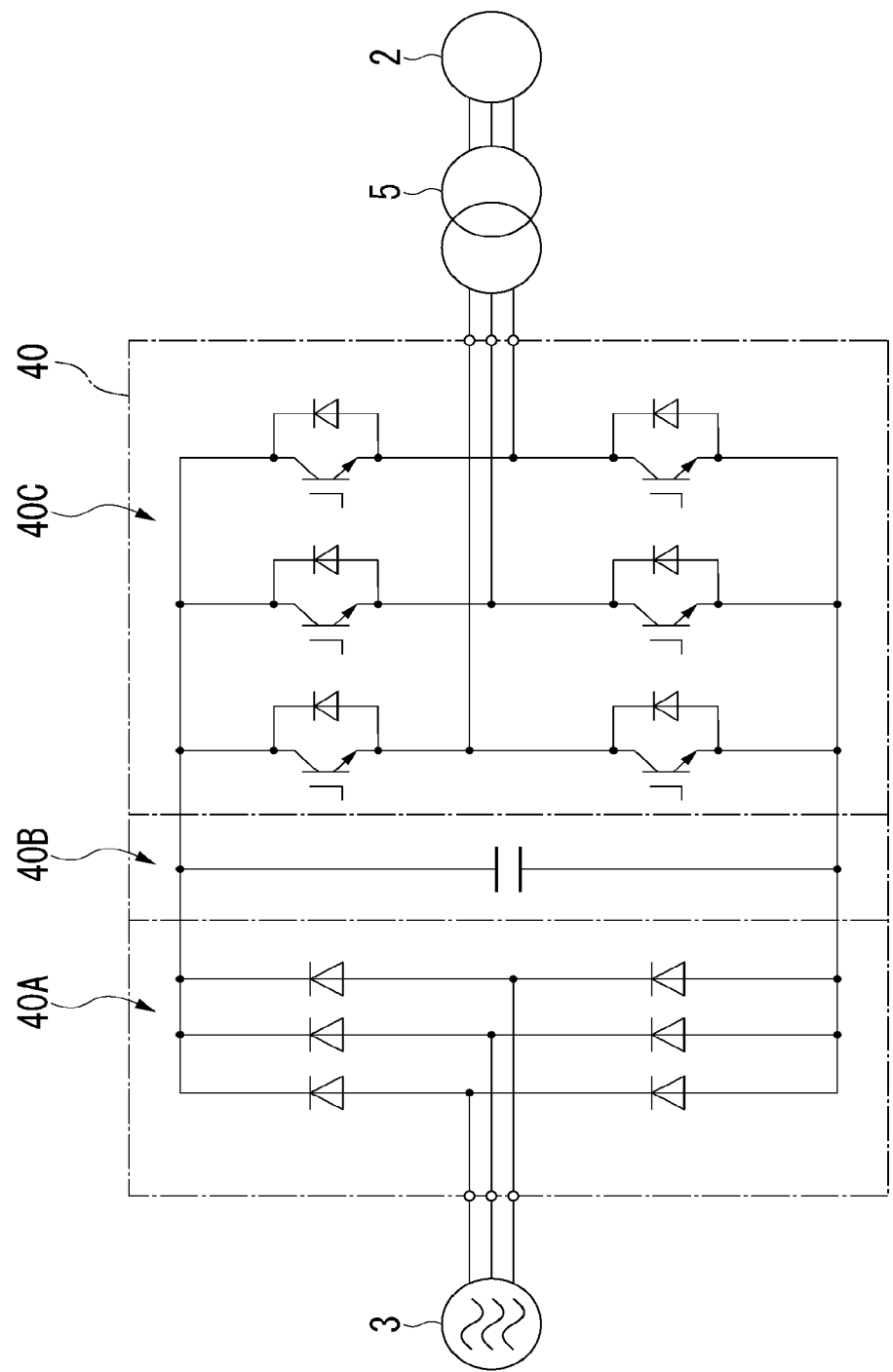
FIG. 6B is a configuration diagram of a power converter according to the second embodiment.

FIG. 6A is a configuration diagram of a drive equipment 1A according to the second embodiment. FIG. 6B is a configuration diagram of a power converter 40 of the second embodiment.

For example, the drive equipment 1A includes a power converter 40, a transformer 5 and a control system 50. The power converter 40 and the control system 50 are used in place of the power converter 4 and the control system 10 of the drive equipment 1.

The power converter 40 includes, for example, a converter 40A, a capacitor 40B, and an inverter 40C.

The converter 40A may have the same configuration as the converter 4A, for example. The capacitor 40B smooths the power converted by the converter 40A. The inverter 40C is configured by bridge-connecting a plurality of switching elements. The inverter 40C is an example of a power converter including the voltage type inverter circuit. ON or OFF of the plurality of switching elements are controlled by the control system 50.

The control system 50 includes, for example, a speed controller 50a, a frequency reference generator 50b (a speed calculation unit in the figure), a magnetic flux calculation unit 50c, a magnetizing current calculation unit 50d, a slip frequency calculation unit 50e, an integrator 50f, a three-phase/two-phase coordinate converter 50g, a current controller 50h, a two-phase/three-phase converter 50i, a PWM controller 50j, a first frequency reference generator 50k, and a subtractor 50l, a divider 50m, an adder 50n, subtractors 50r and 50s, a switch unit 60, and a controller 70.

The speed controller 50a calculates a torque reference signal Tm* (hereinafter * indicates a target value) so that the speed deviation calculated by the subtractor 50l becomes zero on the basis of the speed deviation, and outputs the torque reference signal Tm*. For example, the subtractor 50l calculates a deviation between a speed reference signal ωr* from the frequency reference generator 50b and a speed feedback signal ωr from a speed sensor (a rotor speed detector) 2SS as the speed deviation. The magnetic flux calculation unit 50c calculates a secondary magnetic flux reference signal ϕ2* of the AC motor 4a on the basis of the speed feedback signal ωr. The divider 50m divides the torque reference signal Tm* by the secondary magnetic flux reference signal ϕ2* to obtain a torque current reference signal iq*. The magnetizing current calculation unit 50d calculates an excitation current reference signal id* on the basis of the secondary magnetic flux reference signal ϕ2*. The slip frequency calculation unit 50e calculates a slip frequency signal ωs on the basis of a current reference signal iq* of the torque component and the secondary magnetic flux reference signal ϕ2*. The adder 50n calculates a speed reference signal ϕ2* by adding the slip frequency signal ωs and the speed reference signal ωr*.

The frequency reference generator 50b receives the supply of the frequency F* from the controller 70, generates the speed reference signal ωr* according to the frequency F*, and supplies this speed reference signal ωr* to the subtractor 50l. In the generation of the speed reference signal ωr* in the frequency reference generator 50b, the frequency reference generator 50b may generate the quantized speed reference signal ωr* using a table, like the frequency reference generator 14 described above.

The first frequency reference generator 50k receives the supply of the frequency F* from the controller 70 and generates a speed reference signal ω1* according to the frequency F*. The first frequency reference generator 50k may generate the speed reference signal ω1*, for example, according to the startup frequency pattern described above.

The torque current reference signal iq*, the excitation current reference signal id*, the speed reference signal ω1*, and the speed reference signal ϕ2* obtained thus are given to the switch unit 60.

For example, the switch unit 60 includes a control signal changeover switch 60b, a current setting unit 60c, and a current adjustment unit 60d.

The current setting unit 60c outputs a startup torque current io*0, which is an index value at the time of startup. The current adjustment unit 60d outputs a startup excitation current ip*, which is an index value at the time of startup. The startup torque current io*0 and the startup excitation current ip* may be set to predetermined current values that are determined in advance.

The control signal changeover switch 60b switches between the torque current reference signal iq* and the startup torque current io*0, switches between excitation current reference signal id* and the startup excitation current ip*, and switches between the speed reference signal ω1* and the speed reference signal ω2* under the control of the controller 70. The control signal changeover switch 60b outputs the torque current reference signal iq*, the excitation current reference signal id*, and the speed reference signal ω1* in the first stage at the time of startup. The control signal changeover switch 60b outputs the startup torque current io*0, the startup excitation current ip*, and the speed reference signal ω2* in the subsequent second stage. This second stage corresponds to a normal operating state.

The controller 70 is a controller including a timer (not illustrated). The controller 70 receives an operation start command from a host device, starts the operation of the drive equipment 1A, and starts up the electric motor 2 separately in the first stage and the second stage. The controller 70 controls the control signal changeover switch 60b and the first frequency reference generator 50k according to each stage at the time of startup on the basis of, for example, an elapsed time after reception of the operation start command. This control may be performed according to the control of the first embodiment described above.

The integrator 50f integrates a speed reference signal ω3* on the basis of either the speed reference signal ω1* or the speed reference signal ω2* to obtain a secondary magnetic flux position θ0.

The three-phase/two-phase coordinate converter 50g uses the secondary magnetic flux position θ0 as a reference phase to decompose a current signal from a current detector 31 into a torque current feedback signal iq and an excitation current feedback signal id orthogonal thereto, and outputs the torque current feedback signal iq and the excitation current feedback signal id.

The current controller 50h multiplies a deviation Δiq between the torque current reference signal iq* calculated by the subtractor 50r and the torque current feedback signal iq by a predetermined gain so that the deviation Δiq becomes small or zero, to calculate a torque voltage reference signal Eq*, and output the torque voltage reference signal Eq*. The current controller 50h multiplies a deviation Δid between the excitation current reference signal id* calculated by the subtractor 50s and the excitation current feedback signal id by a predetermined gain so that the deviation Δid becomes small or zero to calculate the excitation voltage reference signal Ed*, and outputs the excitation voltage reference signal Ed*.

The two-phase/three-phase converter 50i calculates three-phase voltage reference signals Vu*, Vv*, and Vw* on the basis of the torque voltage reference signal Eq*, the excitation voltage reference signal Ed*, and the secondary magnetic flux position θ0, and outputs the three-phase voltage reference signals Vu*, Vv*, and Vw*. Here, the PWM controller 50j outputs a gate pulse signal (the control signal GP) subjected to pulse width modulation, on the basis of the obtained three-phase voltage reference signals Vu*, Vv*, and Vw*. The control signal GP is applied to the inverter 40C to turn on or off the plurality of switching elements, thereby performing desired power conversion.

According to the above embodiment, the control signal generation unit in the drive equipment 1A generates the control signal GP for switching between the power semiconductor devices of the inverter 40C on the basis of the voltage reference and the reference phase. The current controller 50h, the two-phase/three-phase converter 50i, and the PWM controller 50j are examples of the control signal generation unit.

A first current reference generator generates a first current reference that is used as a current reference in the first stage related to the startup of the electric motor 2. The current setting unit 60c and the current adjustment unit 60d are examples of the first current reference generator. The first frequency reference generator 50k generates the first frequency reference that is used as a frequency reference in the first stage.

A second current reference generator generates a second current reference that is used as a current reference for performing variable speed control on the electric motor 2 in the second stage after the first stage. The magnetizing current calculation unit 50d and the divider 50m are examples of the second current reference generator. The frequency reference generator 50b generates a second frequency reference that is used as a frequency reference for the variable speed control of the electric motor 2 in the second stage.

The controller 70 generates a control command to switch between signals so that a reference phase based on the first frequency reference and the first current reference are supplied to the control signal generation unit in the first stage related to the startup of the electric motor 2, and a reference phase based on the frequency reference and the second current reference are supplied to the control signal generation unit in the second stage after the first stage. This makes it possible to adjust the frequency and magnitude of the current flowing through the primary winding of the transformer 5 in the first stage. This makes it possible to prevent the operation from being stopped due to the overcurrent, as in the first embodiment.

Third Embodiment

A third embodiment will be described. In the case of the second embodiment shown above, a case in which the speed of the electric motor 2 is detected by using the speed sensor 2SS has been described. In the present embodiment, a case of so-called sensorless control instead of the speed sensor 2SS will be described.

Figure 7:
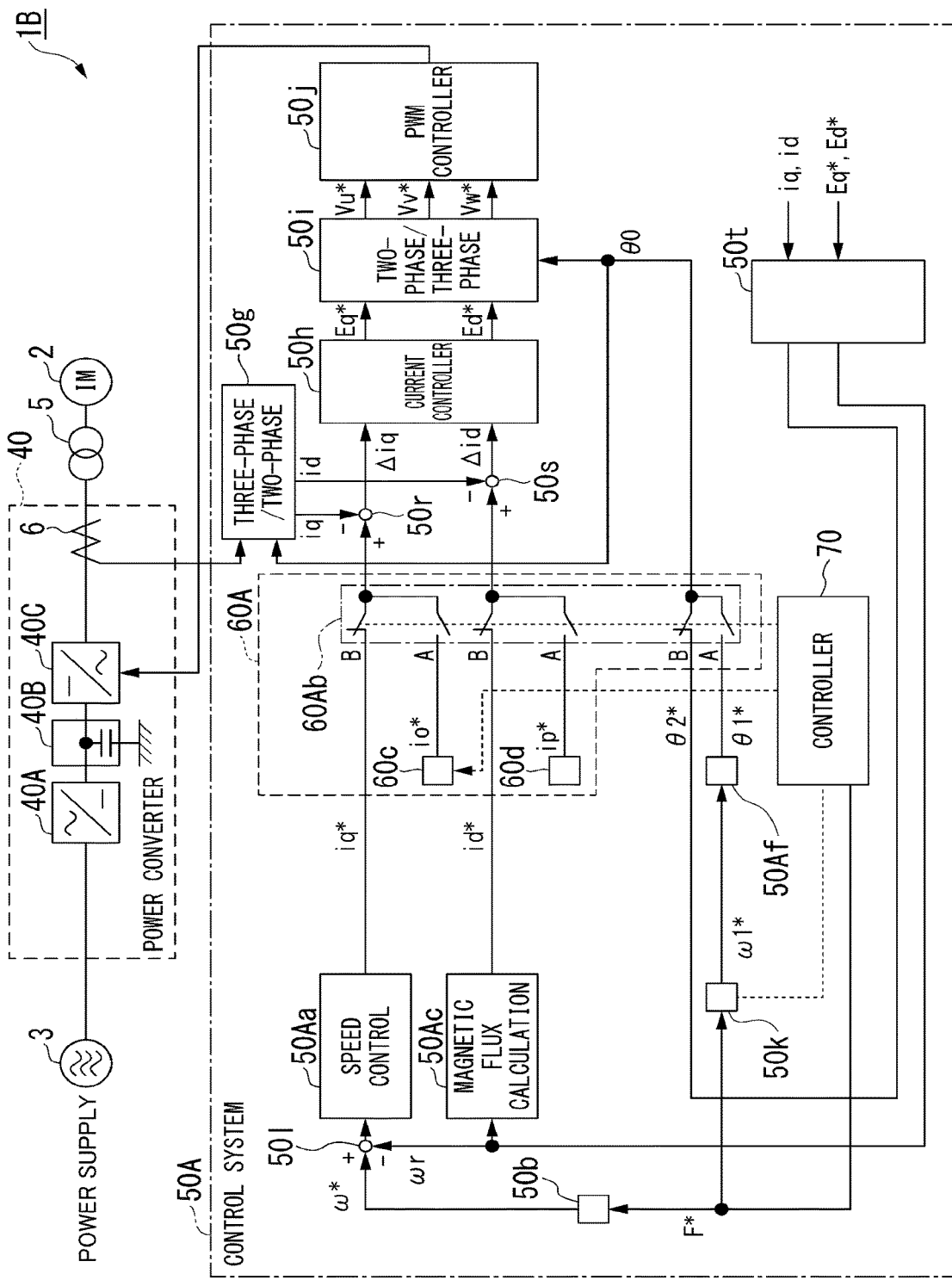
FIG. 7 is a configuration diagram of a drive equipment according to a third embodiment.

FIG. 7 is a configuration diagram of a drive equipment 1B according to the third embodiment.

The drive equipment 1B includes a control system 50A, a switch unit 60A, and a controller 70A instead of the control system 50, the switch unit 60, and the controller 70 of the drive equipment 1A, and the speed sensor 2SS is removed.

The control system 50A further includes a speed phase estimator 50t as compared with the control system 50. The control system 50A includes a speed controller 50Aa, a magnetic flux calculation unit 50Ac, and an integrator 50Af instead of the speed controller 50a, the magnetic flux calculation unit 50c, and the integrator 50f of the control system 50. The control system 50A is configured without the magnetizing current calculation unit 50d, the slip frequency calculation unit 50e, the divider 50m, and the adder 50n.

The speed phase estimator 50t calculates the speed feedback signal $\omega r$ indicating an estimation value of the speed of the electric motor 2 and a secondary magnetic flux position $\theta 2^*$ that is used as the secondary magnetic flux position $\theta 0$ during an operation of the electric motor 2, on the basis of the torque voltage reference signal $Eq^*$, the excitation voltage reference signal $Ed^*$, the torque current feedback signal $iq$, and the excitation current feedback signal $id$.

For the generation of the speed feedback signal $\omega r$ and the secondary magnetic flux position $\theta 2^*$ of the electric motor 2 by the speed phase estimator 50t, a known scheme such as sensorless field oriented control (FOC) may be applied. As a method of generating the speed feedback signal $\omega r$ and the secondary magnetic flux position $\theta 0$ (the secondary magnetic flux position $\theta 2^*$) of the electric motor 2, a scheme using a variable other than the above is known. The application thereof is not limited and appropriate application may be performed.

Each unit in the control system 50A uses the speed feedback signal $\omega r$ generated by the speed phase estimator 50t instead of the speed feedback signal $\omega r$ based on a detection value of the speed sensor 2SS.

For example, the speed controller 50Aa calculates the torque current reference signal $iq^*$ so that the speed deviation calculated by the subtractor 501 becomes zero, using the speed feedback signal $\omega r$. The magnetic flux calculation unit 50Ac calculates the excitation current reference signal $id^*$ on the basis of the speed feedback signal $\omega r$. The integrator 50Af integrates the speed reference signal $\omega 1^*$ calculated by a first frequency reference generator 50k on the basis of the speed feedback signal $\omega r$ to generate the secondary magnetic flux position $\theta 1^*$ that is used at the time of the startup of the electric motor 2.

A control signal changeover switch 60b of the switch unit 60A switches between the torque current reference signal $iq^*$ and the startup torque current $io^*0$, switches between the excitation current reference signal $id^*$ and the startup excitation current $ip^*$, and switches between the secondary magnetic flux position $\theta 1^*$ and the secondary magnetic flux position $\theta 2^*$ under the control of the controller 70A. The control signal changeover switch 60b outputs the torque current reference signal $iq^*$, the excitation current reference signal $id^*$, and the secondary magnetic flux position $\theta 1^*$ in the first stage at the time of startup. The control signal changeover switch 60b outputs the startup torque current $io^*0$, the startup excitation current $ip^*$, and the secondary magnetic flux position $\theta 2^*$ in the subsequent second stage. This second stage corresponds to a normal operating state.

The controller 70A is a controller including a timer (not illustrated). The controller 70A receives an operation start command from a host device, starts the operation of the drive equipment 1B, and starts up the electric motor 2 separately in the first stage and the second stage. The controller 70A controls the control signal changeover switch 60b and the first frequency reference generator 50k according to each stage at the time of startup on the basis of, for example, an elapsed time after reception of the operation start command. This control may be performed according to the control of the first embodiment described above.

According to the above embodiment, a control signal generation unit, a first current reference generator, the first frequency reference generator 50k, and a frequency reference generator 50b correspond to those in the second embodiment.

A second current reference generator of the third embodiment has a different correspondence relationship from that in the second embodiment. For example, the speed controller 50Aa and the magnetic flux calculation unit 50Ac are examples of the second current reference generator of the third embodiment.

Further, the controller 70A generates a control command to switch between signals so that the reference phase generated from the first frequency reference is supplied to the control signal generation unit in the first stage related to the startup of the electric motor, and a result of estimating a second magnetic flux of the electric motor 2 is supplied to the control signal generation unit in the second stage.

For the drive equipment 1B based on sensorless control configured in this way, it is possible to adjust the frequency and magnitude of the current flowing through the primary winding of the transformer 5 in the first stage using the same control method as in the first embodiment. This makes it possible to prevent the operation from being stopped due to the overcurrent, as in the first embodiment.

According to at least of the embodiments described above, the drive equipment includes the transformer, the power converter, and the control system. The transformer may be configured with a primary winding and a secondary winding, and the winding of the electric motor is connected to the secondary winding. The power converter causes a current to flow through the primary winding of the transformer. The control system performs the constant current control on the power converter during the period of the first stage related to the startup of the electric motor to reduce a variation in the current flowing through the primary winding of the transformer, and controls the power converter through variable voltage variable frequency control of the electric motor in the second stage after the first state. This makes it possible for the drive equipment to further improve the stability of the drive control in the power converter that drives the electric motor via the transformer.

Although several embodiments of the present invention have been described, these embodiments are presented as examples and are not intended to limit the scope of the invention. These embodiments can be implemented in various other forms, and various omissions, replacements, and changes can be made without departing from the gist of the invention. These embodiments or modifications thereof are included in the scope or gist of the invention, as well as the scope of the invention described in the claims and equivalents thereof.

REFERENCE SIGNS LIST

1 Drive equipment
2 Electric motor
3 Power supply
4 Power converter
4C Inverter
5 Transformer
6 Current detector
10, 50, 50A Control system
11 First voltage reference generator
12 Second voltage reference generator
13, 50k First frequency reference generator
14, 50b Frequency reference generator
15, 60, 60A Switch unit
16 Integrator
17 Control signal generation unit
20, 70, 70A Controller

The invention claimed is:

1. A drive equipment comprising:
a transformer configured with a primary winding and a secondary winding, an electric motor being connected to the secondary winding;
a power converter configured to cause a current to flow through the primary winding of the transformer; and
a control system configured to perform constant current control on the power converter so that a current at a predetermined desired frequency flows from the power converter to the primary winding of the transformer during a period of a first stage after startup of the electric motor is instructed, to reduce a variation in a current flowing through the primary winding of the transformer, and to control the power converter through variable voltage variable frequency control of the electric motor in a second stage after the first stage,
wherein the control system controls a frequency of the current caused to flow by the power converter so that a frequency component having a frequency higher than a frequency determined in advance in the desired frequency is included in a current flowing the primary winding of the transformer to demagnetize the transformer.

2. The drive equipment according to claim 1, wherein the control system decreases, over time, the current flowing through the primary winding of the transformer during the period of the first stage, and decreases, over time, a frequency of the current flowing through the primary winding of the transformer as the desired frequency during the period of the first stage.

3. The drive equipment according to claim 1, comprising:
a current detector configured to detect the current flowing through the primary winding of the transformer,
wherein the control system performs constant current control using the power converter on the basis of a result of detecting the current and a current reference, the current reference being an index of a current value, during the period of the first stage.

4. The drive equipment according to claim 1, wherein the control system controls a frequency of the current caused to flow by the power converter so that the frequency decreases monotonically over time after a maximum value of a frequency of the current flowing through the primary winding of the transformer to demagnetize the transformer is generated during the period of the first stage.

5. The drive equipment according to claim 1, wherein the control system starts the second stage after a minimum value of the frequency of the current flowing through the primary winding of the transformer to demagnetize the transformer reaches a predetermined value determined in advance during, the period of the first stage.

6. The drive equipment according to claim 1, wherein the control system includes
a control signal generation unit configured to generate a control signal for switching between power semiconductor devices of the power converter on the basis of a voltage reference and a reference phase;
a first voltage reference generator configured to generate a first voltage reference that is used as the voltage reference in the first stage related to startup of the electric motor;
a first frequency reference generator configured to generate a first frequency reference used as a frequency reference in the first stage;
a second voltage reference generator configured to generate a second voltage reference used as the voltage reference for variable speed control of the electric motor in the second stage after the first stage;
a frequency reference generator configured to generate a second frequency reference used as a frequency reference for variable speed control of the electric motor in the second stage;
an integrator configured to generate a reference phase from either the first frequency reference or the second frequency reference; and
a controller configured to generate a control command to switch between signals so that the reference phase based on the first frequency reference and the first voltage reference are supplied to the control signal generation unit in the first stage related to the startup of the electric motor, and the reference phase based on the frequency reference and the second voltage reference are supplied to the control signal generation unit in the second stage after the first stage.

7. The drive equipment according to claim 6, comprising:
a first switch configured to enable the first voltage reference;
a second switch configured to enable the second voltage reference;
a third switch configured to enable the first frequency reference; and
a fourth switch configured to enable the second frequency reference,
wherein the controller
controls the first switch and the third switch so that the first voltage reference and the first frequency reference are enabled during the period of the first stage, and
controls the second switch and the fourth switch so that the second switch and the fourth switch enable the second voltage reference and the second frequency reference during a period of the second stage.

8. The drive equipment according to claim 1, wherein the control system includes
a control signal generation unit configured to generate a control signal for switching between power semiconductor devices of the power converter on the basis of a voltage reference and a reference phase;
a first current reference generator configured to generate a first current reference used as a current reference in the first stage related to the startup of the electric motor;
a first frequency reference generator configured to generate a first frequency reference used as a frequency reference in the first stage;
a second current reference generator configured to generate a second current reference used as the current reference for variable speed control of the electric motor in the second stage after the first stage;
a frequency reference generator configured to generate a second frequency reference used as a frequency reference for variable speed control of the electric motor in the second stage; and
a controller configured to generate a control command to switch between signals so that a reference phase based on the first frequency reference and the first current reference are supplied to the control signal generation unit in the first stage related to the startup of the electric motor, and a reference phase based on the frequency reference and the second current reference are supplied to the control signal generation unit in the second stage after the first stage.

9. A control method for a drive equipment including a transformer configured with a primary winding and a secondary winding, a winding of an electric motor being connected to the secondary winding, and a power converter configured to cause a current to flow through the primary winding of the transformer, the control method comprising:
performing constant current control on the power converter so that a current at a predetermined desired frequency flows from the power converter to the primary winding of the transformer during a period of a first stage related to startup of the electric motor to reduce a variation in the current flowing through the primary winding of the transformer;
controlling the power converter through variable voltage variable frequency control of the electric motor in a second stage after the first stage; and
controlling a frequency of the current caused to flow by the power converter so that a frequency component having a frequency higher than a frequency determined in advance in the desired frequency is included in a current flowing the primary winding of the transformer to demagnetize the transformer.

10. A drive equipment comprising:
a transformer including a primary winding and a secondary winding, an electric motor being connected to the secondary winding;
a power converter configured to cause a current to flow through the primary winding of the transformer; and
a control system configured to perform constant current control on the power converter so that a current at a predetermined desired frequency flows from the power converter to the primary winding of the transformer during a period of a first stage after startup of the electric motor is instructed, to reduce a variation in a current flowing through the primary winding of the transformer, and to control the power converter through variable voltage variable frequency control of the electric motor in a second stage after the first stage;
wherein the control system decreases, over time, the current flowing through the primary winding of the transformer during the period of the first stage, and decreases, over time, a frequency of the current flowing through the primary winding of the transformer as the desired frequency during the period of the first stage.

* * * * *